United States Patent
Iida (10) Patent No.: US 8,696,785 B2
(45) Date of Patent: Apr. 15, 2014

(54) METHOD AND APPARATUS FOR RECYCLING BATTERY PACK

(75) Inventor: Shuji Iida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 678 days.

(21) Appl. No.: 12/487,899

(22) Filed: Jun. 19, 2009

(65) Prior Publication Data

US 2009/0314134 A1    Dec. 24, 2009

(30) Foreign Application Priority Data

Jun. 19, 2008   (JP) ................. 2008-160489

(51) Int. Cl.
 C22B 23/00    (2006.01)
 C22B 1/14     (2006.01)
 H01M 10/54    (2006.01)

(52) U.S. Cl.
 USPC .............. 75/10.67; 75/628; 266/137; 429/49

(58) Field of Classification Search
 USPC ................... 75/10.67, 628; 266/137; 429/49
 See application file for complete search history.

(56) References Cited

U.S. PATENT DOCUMENTS

| | | | | |
|---|---|---|---|---|
| 5,513,582 | A | * | 5/1996 | Antonini et al. ............ 110/238 |
| 6,524,737 | B1 | * | 2/2003 | Tanii et al. ..................... 429/49 |
| 7,713,396 | B2 | | 5/2010 | Kakuta et al. |
| 2006/0159984 | A1 | | 7/2006 | Nagayama et al. |

FOREIGN PATENT DOCUMENTS

| | | |
|---|---|---|
| JP | 06322452 | 11/1994 |
| JP | 10046266 | 2/1998 |
| JP | 11-248119 A | 9/1999 |
| JP | 11242967 A | 9/1999 |
| JP | 2000-055546 A | 2/2000 |
| JP | 2002184471 A | 6/2002 |
| JP | 2002226923 A | 8/2002 |
| JP | 2004339572 A | 12/2004 |
| JP | 2005011698 A | 1/2005 |
| JP | 2005-194990 A | 7/2005 |
| JP | 2006004884 A | 1/2006 |
| JP | 2006222066 A | 8/2006 |
| JP | 2008-095055 A | 4/2008 |

OTHER PUBLICATIONS

Japanese Office Action issued Nov. 15, 2011 from Japanese Patent Application No. 2008-160489 and English translation thereof.

* cited by examiner

*Primary Examiner* — Keith Walker
*Assistant Examiner* — Alexander Polyansky
(74) *Attorney, Agent, or Firm* — GIfford, Krass, Sprinkle, Anderson & Citkowski, P.C.

(57) ABSTRACT

A method for recycling a battery pack includes steps of: roasting the battery pack that houses a battery assembly that is in a charged condition, as it is, dismantling the roasted battery pack and separating the battery pack into unit cells and parts other than the unit cells, comminuting the unit cells obtained by separation, washing and screening the comminuted cells, dehydrating a slurry below a sieve after screening and recovering metals used for positive and negative electrodes, and recovering metal containing nickel by magnetically separating metal remaining on the sieve after screening, using a magnet.

20 Claims, 8 Drawing Sheets

METHOD AND APPARATUS FOR RECYCLING BATTERY PACK

INCORPORATION BY REFERENCE

The disclosure of Japanese Patent Application No. 2008-160489 filed on Jun. 19, 2008, including the specification, drawings and abstract, is incorporated herein by reference in its entirety.

BACKGROUND OF THE INVENTION

1. Field of the Invention

The invention relates to method and apparatus for recycling battery packs, and particularly to method and apparatus capable of safely recycling battery packs without waiting until the battery packs are naturally discharged.

2. Description of the Related Art

Figure 8:
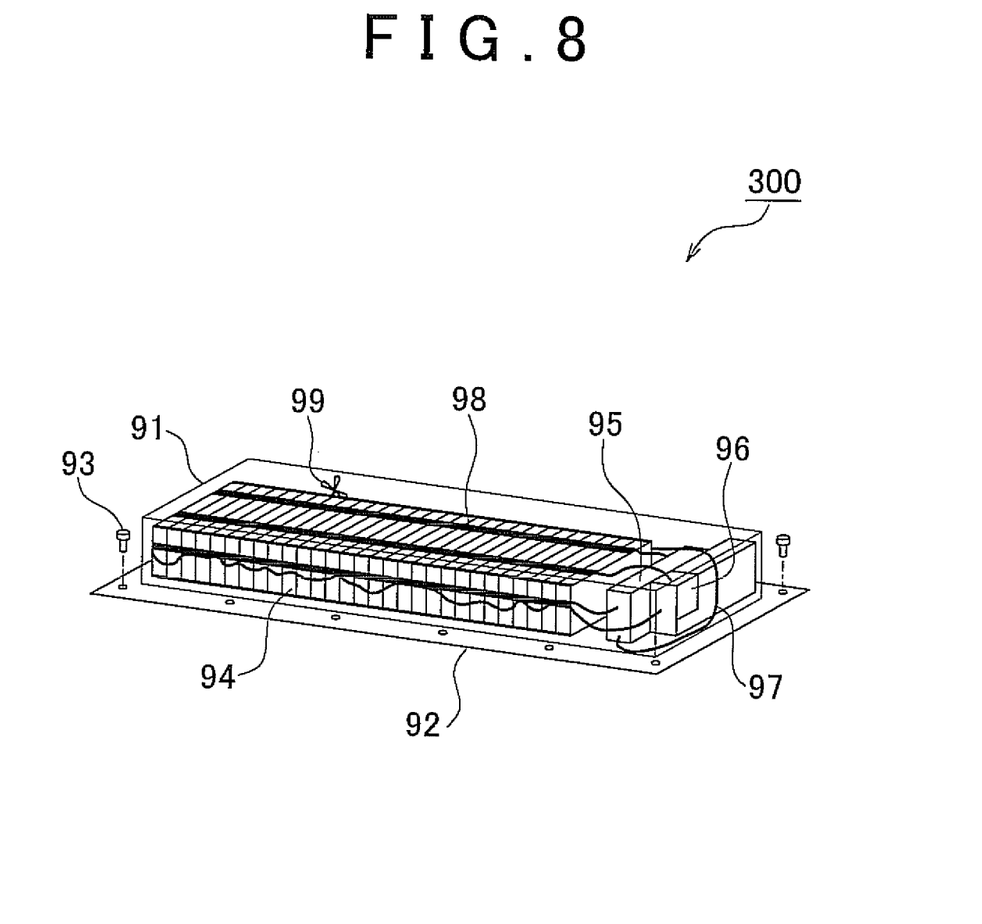
FIG. 8 is a schematic diagram illustrating the construction of one example of battery pack.

Generally, a battery pack 300 includes a battery assembly composed of a plurality of (e.g., 10 pieces of) battery modules 94 that are connected in series, as shown in FIG. 8 by way of example. Each of the battery modules 94 has a plurality of (e.g., about 6 to 8 pieces of) battery cells (which will be also called "unit cells") of secondary batteries, such as nickel-metal hydride batteries or lithium-ion batteries, which are connected in series. The battery pack 300 further includes a control device 95 for controlling the battery assembly by monitoring charged or discharged conditions (or the states of charge) of the individual battery modules 94 and the battery modules 94 as a whole, relays for cutting off electric circuits and a safety plug 96 for mechanically cutting off circuits, a cooling blower 99 for cooling the battery assembly, and signal lines 98 and power lines 97 for connecting respective parts or components. All of these components are housed in a single case 91 that is closed by a lower plate 92, and are hermetically sealed in the lower plate 92 and the case 91. The battery pack 300 is fixed to a vehicle, for example, with connecting bolts 93 inserted through holes formed in the lower plate 92. In general, the battery pack 300 as described above is handled as an independent automobile part, and its charged portions are not exposed to the outside of the case 91.

When the battery assembly in the battery pack as describe above reaches the end of its life, the battery pack is dismantled or disassembled, and the battery assembly is separated from the other parts, so that valuable metals are recovered from the battery assembly. If the battery assembly in the battery pack is in a charged condition (which may also be called "active condition") (normally, 200V when it is fully charged), the separating operation involves handling of voltage-carrying parts or wires.

In the meantime, Japanese Patent Application Publication No. H10-46266 (JP-A-10-46266) discloses a method for recovering metal cobalt from scrap batteries, though the disclosed method is not a method of recycling battery packs. The disclosed method includes the steps of: roasting scrap batteries of secondary batteries containing cobalt in an electrode material, at a temperature equal to or higher than 600° C., shredding and screening the roasted batteries, separating the batteries into metal scrap and ash produced by roasting, magnetically separating cobalt-containing materials from the separated ash, using a magnet, and dissolving the separated cobalt-containing materials in an acid, so as to recover metal cobalt.

Japanese Patent Application Publication No. H06-322452 (JP-A-6-322452) discloses a method for recovering valuable metals from spent lithium secondary batteries, which involves the steps of: comminuting spent lithium secondary batteries and then separating the resultant materials into magnetic substances and non-magnetic substances by first magnetic separation, roasting the obtained non-magnetic substances at 500-1000° C. under a non-oxidizing atmosphere or reducing atmosphere so as to reduce the non-magnetic substances, and further separating the resultant substances into magnetic substances and non-magnetic substances by second magnetic separation, thereby to recover valuable metals.

The recovering method as described in JP-A-6-322452 is a method of recycling spent secondary batteries as described above. In the case where a battery assembly composed of secondary cells and housed in a battery pack is to be recycled, it is still necessary to dismantle the battery pack and take the secondary cells out of the battery pack. If the battery assembly composed of the secondary cells is in a charged condition, the dismantling of the battery pack involves removal or detachment of high-voltage-carrying secondary cells, control device and wires from the battery pack, and requires workers to wear insulating protectors. Thus, it takes time and effort to accomplish the dismantling job.

Also, if the battery assembly is taken out of the battery pack after the battery assembly is discharged, for enhanced work safety, the battery pack needs to be kept in storage for a long duration of time so as to be naturally discharged, or needs to be forced to be discharged using, for example, a resistor. In these cases, the recycling operation may be prolonged or requires an additional step(s).

SUMMARY OF THE INVENTION

The invention provides method and apparatus for recycling battery packs, which make it possible to recover valuable metals from parts of the battery packs and battery assemblies with improved safety, in a shorter work time than that of the related art, without requiring the battery packs to be dismantled.

The battery-pack recycling method and battery-pack recycling apparatus according to the present invention have features as described below.

A first aspect of the invention is concerned with a method for recycling a battery pack including a battery assembly having a plurality of unit cells connected in series, and a controller that controls the battery assembly. The recycling method includes a step of roasting the battery pack that houses the battery assembly that is in a charged condition as it is.

When the battery pack that houses the battery assembly that is in a charged condition is roasted as it is, resin parts and insulating materials in the battery pack are thermally decomposed, and shortings occur in the battery pack, thereby to disrupt the function of the battery pack and accomplish a discharging process with reliability. Accordingly, dismantling of the battery pack to which a high voltage is applied can be avoided, and the battery pack need not be kept in storage for a long duration of time for natural discharge before roasting, nor need be forced to be discharged. Thus, the recycling operation can be safely accomplished with improved efficiency, in a shorter time than that required in the related art.

In the method according to the first aspect of the invention, if a resin part is contained in the battery pack, a roasting temperature at which the battery assembly is roasted is equal to or higher than a carbonization temperature of resin that forms the resin part, and is equal to or lower than a melting point of each metal part of the battery pack.

Where a resin part(s) is contained in the battery pack, the roasting temperature is controlled to be equal to or higher than the carbonization temperature of resin that forms the resin part(s), so that oxygen in the roasting space is consumed when the resin is carbonized. As a result, the battery assembly in the battery pack is roasted under a non-oxidizing atmosphere or reducing atmosphere, and nickel hydroxide as a battery material can be reduced to metal nickel. Also, valuable elemental metals as original battery materials can be recovered. Furthermore, the roasting temperature is controlled to be equal to or lower than the melting point of each metal part of the battery pack, so that the metal parts in the battery pack can be recovered substantially in their original forms, and thus allowed to be easily reused.

The recycling method may further include a step of separating the roasted battery pack into the unit cells and parts other than the unit cells.

In the above manner, metal parts other than the unit cells in the battery pack and valuable metals originating from the unit cells (hereinafter also called "battery cells") can be separated from each other and recovered.

The recycling method may further includes a step of comminuting the unit cells obtained by separation.

By comminuting the roasted unit cells, the valuable metals originating from the unit cells can be further separated and recovered, according to the form or size and/or physical properties.

The recycling method may further includes steps of washing the comminuted unit cells, and screening the washed cells with a sieve.

By carrying out the washing and screening steps, the valuable metals originating from the unit cells can be separated according to the form or size.

The recycling method may further include a step of recovering metal containing nickel from metals remaining on the sieve after screening, by magnetic separation using a magnet.

The metals remaining on the sieve and having relatively large particle sizes magnetically separated, using a magnet, into metal having strong magnetizing force and metal having weak magnetizing force.

The recycling method may further include a step of recovering metals used for a positive electrode and a negative electrode, by dehydrating a slurry below the sieve after screening.

In the above manner, the metals used as positive-electrode and negative-electrode materials having relatively small particle sizes, which have passed through the sieve, can be separated and recovered.

The metal used for the negative electrode may be a rare-earth metal.

A second aspect of the invention is concerned with a battery-pack recycling apparatus for recycling a battery pack including a battery assembly having a plurality of unit cells connected in series, and a controller that controls the battery assembly. The recycling apparatus includes a roasting device that roasts the battery pack that houses the battery assembly that is in a charged condition as it is, a separating device that separates the roasted battery pack into unit cells and parts other than the unit cells, a comminuting device that comminutes the unit cells obtained by separation, a screening device that screens the comminuted cells with a sieve, a magnetic separator that magnetically separates metals remaining on the sieve of the screening device, using a magnet, and a recovering device that recovers metals used for a positive electrode and a negative electrode, which are located below the sieve of the screening device.

When the battery pack that houses the battery assembly that is in a charged condition is roasted as it is, resin parts and insulating materials in the battery pack are thermally decomposed, and shortings occur in the battery pack, thereby to disrupt the function of the battery pack and accomplish a discharging process with reliability. Accordingly, dismantling of the battery pack to which a high voltage is applied can be avoided, and the battery pack need not be kept in storage for a long duration of time for natural discharge before roasting, nor need be forced to be discharged. Thus, the recycling operation can be safely accomplished with improved work efficiency, in a shorter time than that required in the related art. Also, metal parts other than the unit cells in the battery pack and valuable metals originating from the unit cells can be separated from each other and recovered. By comminuting the roasted unit cells, the valuable metals originating from the unit cells can be further separated according to the form or size and/or physical properties, and recovered.

In the battery-pack recycling apparatus according to the second aspect of the invention, the roasting device may roast the battery assembly in the battery pack under a non-oxidizing atmosphere or a reducing atmosphere.

By roasting the battery assembly in the battery pack under the non-oxidizing atmosphere or reducing atmosphere, it is possible to recover metal nickel without oxidizing nickel in the battery assembly. Also, nickel hydroxide and cobalt hydroxide used as materials for positive electrodes, or the like, can be reduced and recovered.

Also, if a resin component is contained in the battery pack, the roasting device may roast the battery assembly at a roasting temperature that is equal to or higher than a carbonization temperature of resin that forms the resin part, and is equal to or lower than a melting point of each metal part of the battery pack.

Where a resin part(s) is contained in the battery pack, the roasting temperature is controlled to be equal to or higher than the carbonization temperature of resin that forms the resin part(s), so that oxygen in the roasting space is consumed when the resin is carbonized. As a result, the battery assembly in the battery pack is roasted under a non-oxidizing atmosphere or reducing atmosphere, and valuable elemental metals can be recovered. Furthermore, the roasting temperature is controlled to be equal to or lower than the melting point of each metal part of the battery pack, so that the metal parts in the battery pack can be recovered substantially in their original forms or shapes, and thus can be easily reused. Also, when a case made of resin is heated, it is converted into hot cracked gases and then carbonized. The hot cracked gases may be effectively used as a heat source for roasting.

According to the present invention, when the battery pack that houses the battery assembly that is in a charged condition is roasted as it is, resin parts and insulating materials in the battery pack are thermally decomposed, and shortings occur in the battery pack, thereby to disrupt the function of the battery pack and accomplish a discharging process with reliability. Accordingly, dismantling of the battery pack to which a high voltage is applied can be avoided, and the battery pack need not be kept in storage for a long duration for natural discharge before roasting, nor need be forced to be discharged. Thus, the recycling operation can be safely accomplished with improved work efficiency, in a shorter time than that required in the related art.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

A method for recycling battery packs and an apparatus for recycling battery packs according to one embodiment of the invention will be described with reference to the drawings. The battery packs to be recycled in this embodiment has the same construction as the battery pack 300 as described above and shown in FIG. 8, and therefore will not be described herein.

Figure 1:
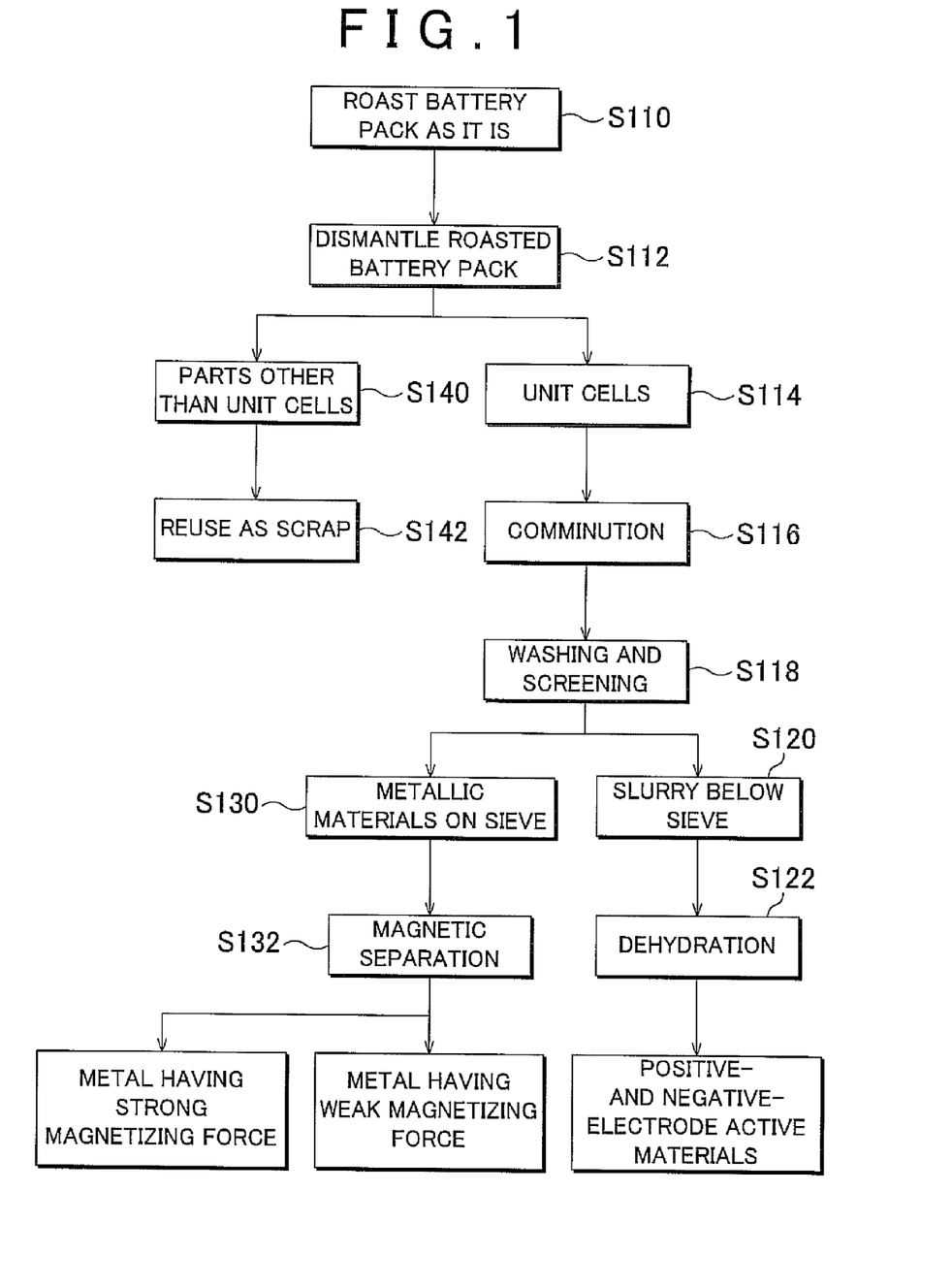
FIG. 1 is a flowchart illustrating one example of method for recycling a battery pack according to one embodiment of the invention.

The battery-pack recycling method of this embodiment is a method of recycling battery packs each including a battery assembly having a plurality of unit cells that are connected in series, and a controller that controls the battery assembly. This method includes a step (S110) of roasting the battery pack that houses the battery assembly that is in a charged condition, as it is, as shown in FIG. 1. Furthermore, the battery-pack recycling method of this embodiment includes a step (S112) of dismantling the roasted battery pack, steps (S114, S140) of separating pieces of the dismantled battery pack into unit cells and parts other than the unit cells, step (S116) of comminuting or pulverizing the unit cells obtained by separation, step (S118) of washing the comminuted cells and screening the same with a sieve, steps (S120, S122) of dewatering slurry placed below the sieve after screening and recovering metals used for positive electrode and negative electrode, and steps (S130, S132) of magnetically separating metals remaining on the sieve after screening, using a magnet, so as to recover metal containing nickel.

The battery-pack recycling apparatus of this embodiment includes a roasting device for roasting the battery pack that houses the battery assembly that is in a charged condition, as it is, separating means for separating pieces of the roasted battery pack into unit cells and parts other than the unit cells, comminuting device for comminuting the unit cells resulting from the separation, screening device for screening or sieving the comminuted cells, magnetic separator for magnetically separating metals remaining on a sieve of the screening device, using a magnet, and a recovery device for recovering metals used for positive electrode and negative electrode, which are present below the sieve of the screening device.

Next, each step of the battery-pack recycling method according to this embodiment of the invention and the construction of each device of the battery-pack recycling apparatus used in each step will be described with reference to FIG. 1 through FIG. 7.

In the step (S110) of roasting the battery pack that houses the battery assembly that is in a charged condition, as it is, as shown in FIG. 1, the battery pack that houses the battery assembly in which unit cells comprising secondary batteries, such as nickel-metal hydride batteries or lithium-ion batteries, are connected in series is not dismantled, but is roasted as it is at a first roasting temperature which is equal to or higher than a temperature that permits thermal decomposition of resins used for resin parts and insulating materials in the battery pack, and which is equal to lower than melting points of metallic parts in the battery pack, for example, at a roasting temperature from about 500° C. to about 600° C. As a result, the resin parts and insulating materials in the battery pack are thermally decomposed, and shortings occur in the battery pack, thereby to disrupt the function of the battery pack and accomplish a discharging process with reliability. Also, the resins used for resin parts and insulating materials in the battery pack, and an electrolyte, can be thermally decomposed. In battery packs, resin parts are extensively used in the battery assembly and as parts, such as a case that houses the battery assembly, or the like, and a cooling blower, and the resins of these resin parts are converted during the roasting step into hot cracked gases, which can be effectively used as a heat source for self-heating. By controlling the first roasting temperature to, for example, within the range of about 500° C. to 600° C., it is possible to prevent melting of metallic parts, such as aluminum parts, in the battery pack, and minimize oxidation, thermal deformation and baking of parts of an iron case, thus facilitating material separating operations, such as detachment of connecting bolts made of metal, in the later material separation process.

Figure 2:
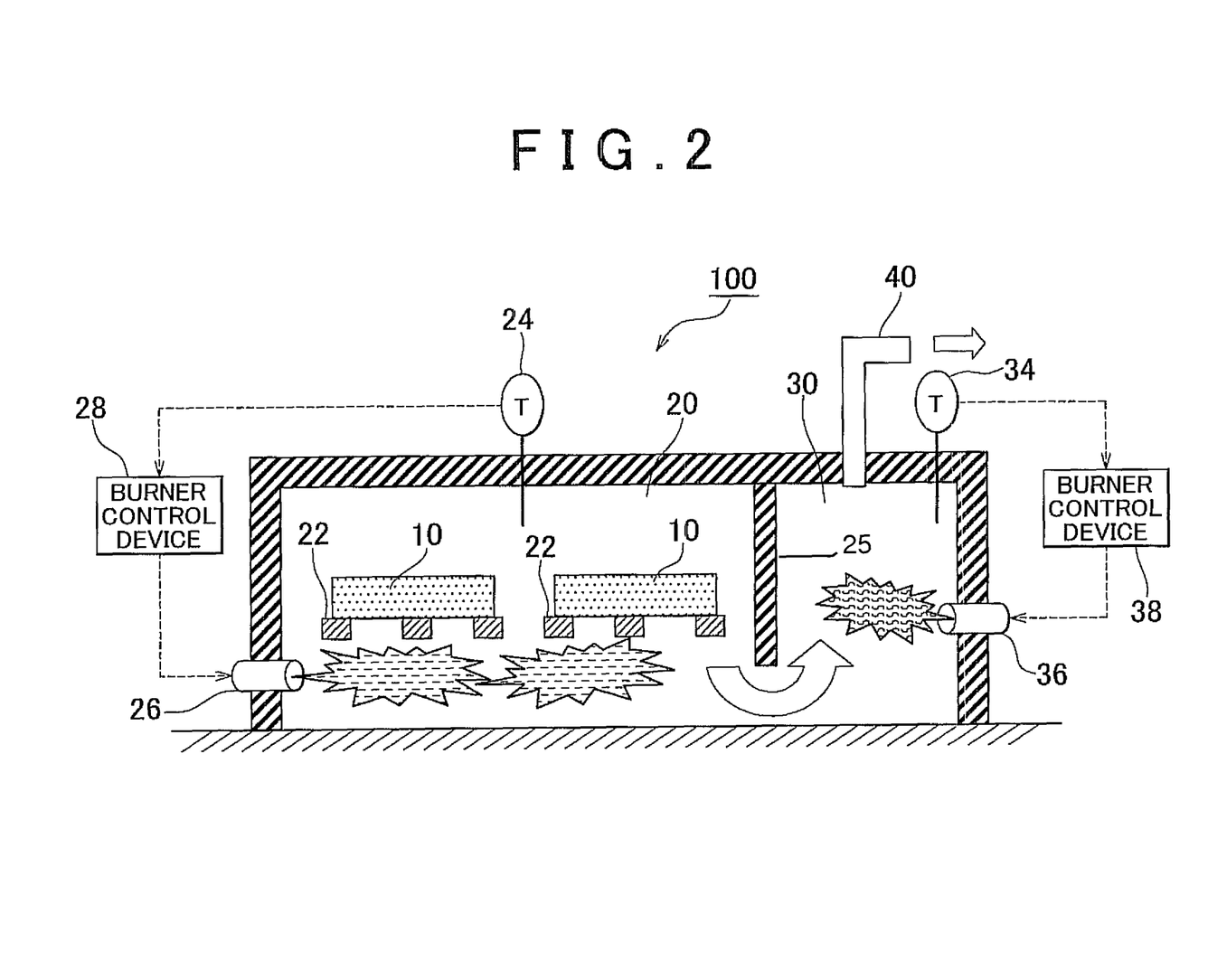
FIG. 2 is a schematic diagram explaining the arrangement of one example of roasting device of this embodiment.

One example of roasting device of the battery-pack recycling apparatus, which is used in the roasting step, will be described with reference to FIG. 2. The roasting device 100 shown in FIG. 2 has a primary combustion chamber 20 and a secondary combustion chamber 30. The primary combustion chamber 20 and the secondary combustion chamber 30 are separated by a partition member 25. Specifically, the partition member 25 extends between an upper portion of the primary combustion chamber 20 and an upper portion of the secondary combustion chamber 30 to separate the upper portion of the primary combustion chamber 20 and an upper portion of the secondary combustion chamber 30 while leaving a lower portion of the primary combustion chamber 20 and a lower portion of the secondary combustion chamber 30 in communication. The primary combustion chamber 20 and the secondary combustion chamber 30 are respectively provided with heating burners 26, 36, temperature sensors 24, 34 for measuring the temperatures in the respective combustion chambers, and burner control devices 28, 38. The burner control devices 28, 38 control the heating burners 26, 36, respectively, according to outputs from the temperature sensors 24, 34. For example, thermocouples may be used as the temperature sensors 24, 34.

More specifically, one or a plurality of battery packs 10 each housing the battery assembly in which unit cells comprising secondary batteries, such as nickel-metal hydride batteries or lithium-ion batteries, are connected in series is/are placed on a fire grate 22 in the primary combustion chamber 20, and each of the battery packs 10 is heated from beneath the position at which the battery pack 10 is located, using the heating burner 26, with air being fed into the primary combustion chamber 20 as needed. The burner control device 28 controls the amount of combustion by the heating burner 26, based on the output from the temperature sensor 24, so that the temperature in the primary combustion chamber 20 is kept at the first roasting temperature (for example, 500-600° C.).

As a result, hot cracked gases produced by heating due to thermal decomposition of the resin materials in the battery pack 10 come into contact with air in the lower portion of the primary combustion chamber 20, and burn while being balanced with air in a combustible range. The heat resulting from the combustion of the hot cracked gases is used as a heat source for heating the battery packs. Also, since oxygen in the primary combustion chamber 20 is consumed during burning of the resins, the battery assembly in the battery pack 10 is roasted under a non-oxidizing or reducing atmosphere, and is therefore prevented from being oxidized, thus allowing variable elemental metals to be recovered with high efficiency. In particular, the battery pack 10 is heated with its side walls and top part being sealed and with only the bottom part being opened, so that hot cracked gases are likely to be produced in the lower portion of the primary combustion chamber 20. A first roasting period of time for which the battery pack 10 is roasted at the first roasting temperature is suitably set to a time period required for the resin materials in the battery pack to disappear. In a demonstrative test using a certain battery pack, for example, it was confirmed that variable elemental metals were recovered with high efficiency when the first roasting temperature was set to 500° C. and the first roasting period was set to 1 hour.

Then, unburned hot cracked gases that have not burned in the primary combustion chamber 20 flow from the lower portion of the primary combustion chamber 20 below the partition member 25 into the secondary combustion chamber 30, and are completely burned with air in the secondary combustion chamber 30, at a second roasting temperature of, for example, 800° C., for at least two seconds, using the temperature sensor 34, burner control device 38 and the heating burner 36. The volume of the secondary combustion chamber 30 may be set to a volume that permits exhaust gases from the primary combustion chamber 20 to be held therein for two seconds. In this manner, maintenance criteria of the Japanese laws concerning disposal and cleaning of wastes can be satisfied.

Then, exhaust gases resulting from secondary roasting in the secondary combustion chamber 30 pass through a gas duct 40, and is cleaned by an exhaust treatment device (not shown) having an activated charcoal absorption tower and a dust collector, to be released to the atmosphere.

Figure 3:
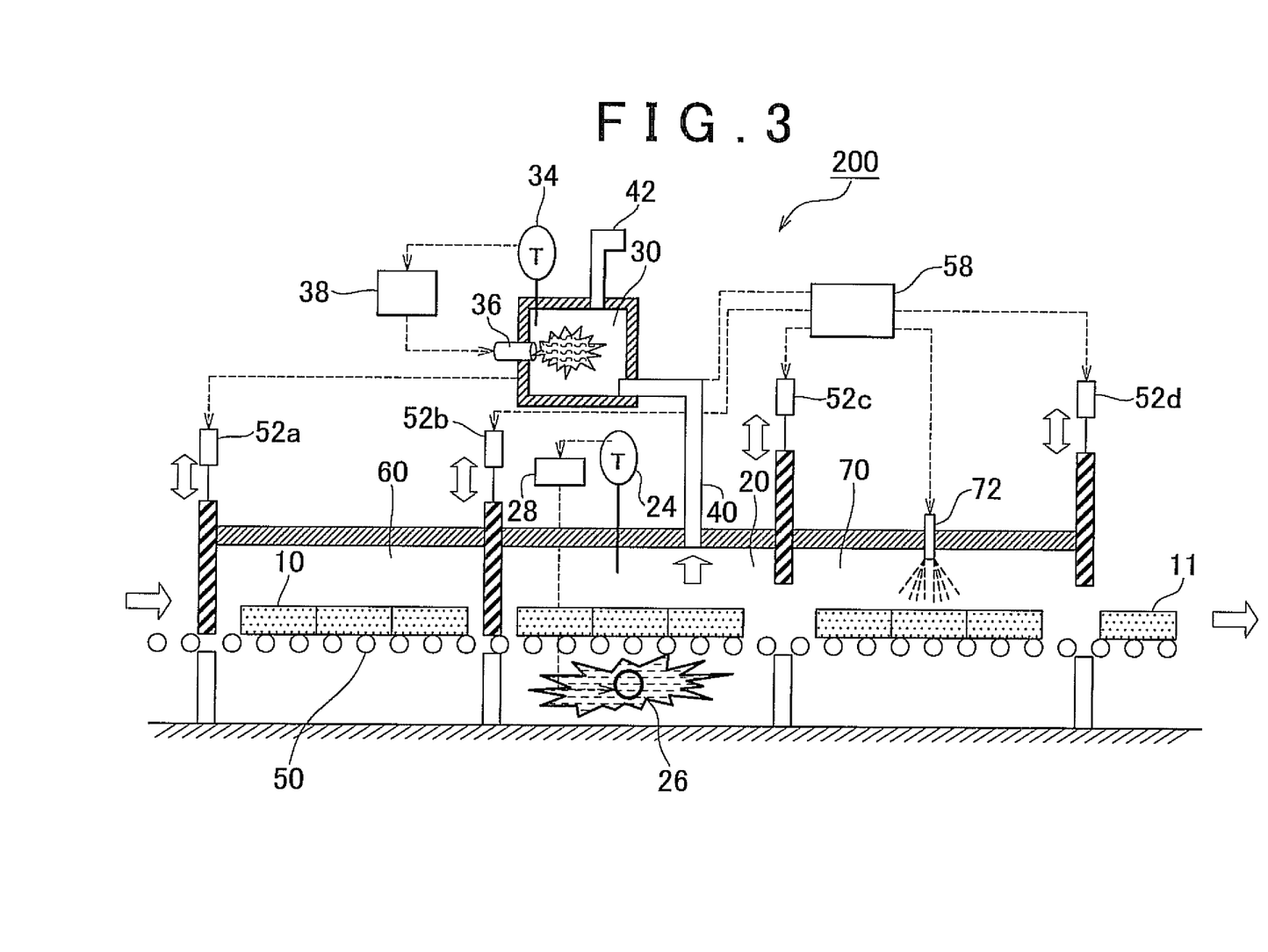
FIG. 3 is a schematic diagram explaining the arrangement of another example of roasting device of this embodiment.

Next, another example of roasting device according to this embodiment will be described with reference to FIG. 3. While the roasting device 100 as shown in FIG. 2 is of a batch type, the roasting device 200 as shown in FIG. 3 is of a continuous tunnel kiln type. In FIG. 3, the same reference numerals as used in FIG. 2 are used for identifying the same or corresponding constituent elements, of which explanation will be omitted as appropriate.

As shown in FIG. 3, the roasting device 200 of this embodiment has a preheating chamber 60, primary combustion chamber 20, secondary combustion chamber 30, and a cooling chamber 70, and one or a plurality of battery packs 10 is/are conveyed by a roller conveyor 50 through the preheating chamber 60, primary combustion chamber 20, secondary combustion chamber 30 and the cooling chamber 70. The preheating chamber 60, primary combustion chamber 20, secondary combustion chamber 30 and the cooling chamber 70 are closed tightly or opened by respective doors 52a, 52b, 52c, 52d, so that the battery pack(s) 10 can be conveyed and subjected to each process. A water spray 72 for water cooling is provided in the cooling chamber 70. The doors 52a, 52b, 52c, 52d and the water spray 72 are respectively controlled by a controller 58. As described above, the primary combustion chamber 20 and the secondary combustion chamber 30 are respectively provided with the heating burners 26, 36, temperature sensors 24, 34 for measuring the temperatures in the respective combustion chambers, and the burner control devices 28, 38, and the burner control devices 28, 38 control the heating burners 26, 36, respectively, according to the outputs from the temperature sensors 24, 34.

In the roasting device 200 of this embodiment, the door 52a is initially brought into an open state, and one or a plurality of battery packs 10 is/are fed into the preheating chamber 60 by the roller conveyor 50. Then, with the doors 52a, 52b held in closed states, the battery pack or packs 10 is/are preheated at a certain temperature in the preheating chamber 60. The preheated battery pack or packs 10 is/are then fed into the primary combustion chamber 20 by the roller conveyor 50. With air being supplied into the primary combustion chamber 20 as needed, each of the battery packs 10 is heated from beneath the position at which the battery pack 10 is located or from side faces (not shown) of the battery pack, by means of the heating burner 26. The burner control device 28 controls the amount of combustion by the heating burner 26, based on the output from the temperature sensor 24, so that the temperature in the primary combustion chamber 20 is kept at a first roasting temperature (e.g., 500 to 600° C.). On the other hand, unburned hot cracked gases that have not burned in the primary combustion chamber 20 are fed to the secondary combustion chamber 30 via a gas duct 40, and is completely burned with air in the secondary combustion chamber 30, at a second roasting temperature of, for example, 800° C., for at least two seconds, using the temperature sensor 34, burner control device 38 and the heating burner 36. Exhaust gases resulting from secondary roasting in the secondary combustion chamber 30 pass through a gas duct 42, and is cleaned by an exhaust treatment device (not shown) having an activated charcoal absorption tower and a dust collector, to be released to the atmosphere. Then, the door 52c is brought into an open state, and the battery pack(s) roasted in the primary combustion chamber 20 is/are fed into the cooling chamber 70, where the roasted battery pack(s) 11 is/are cooled down to a temperature that permits dismantling of the battery pack(s), by means of the water spray 72. Then, with the door 52d placed in an open state, the roasted battery pack(s) 11 thus cooled is/are fed to a dismantling/separating step as the next step.

Figure 4:
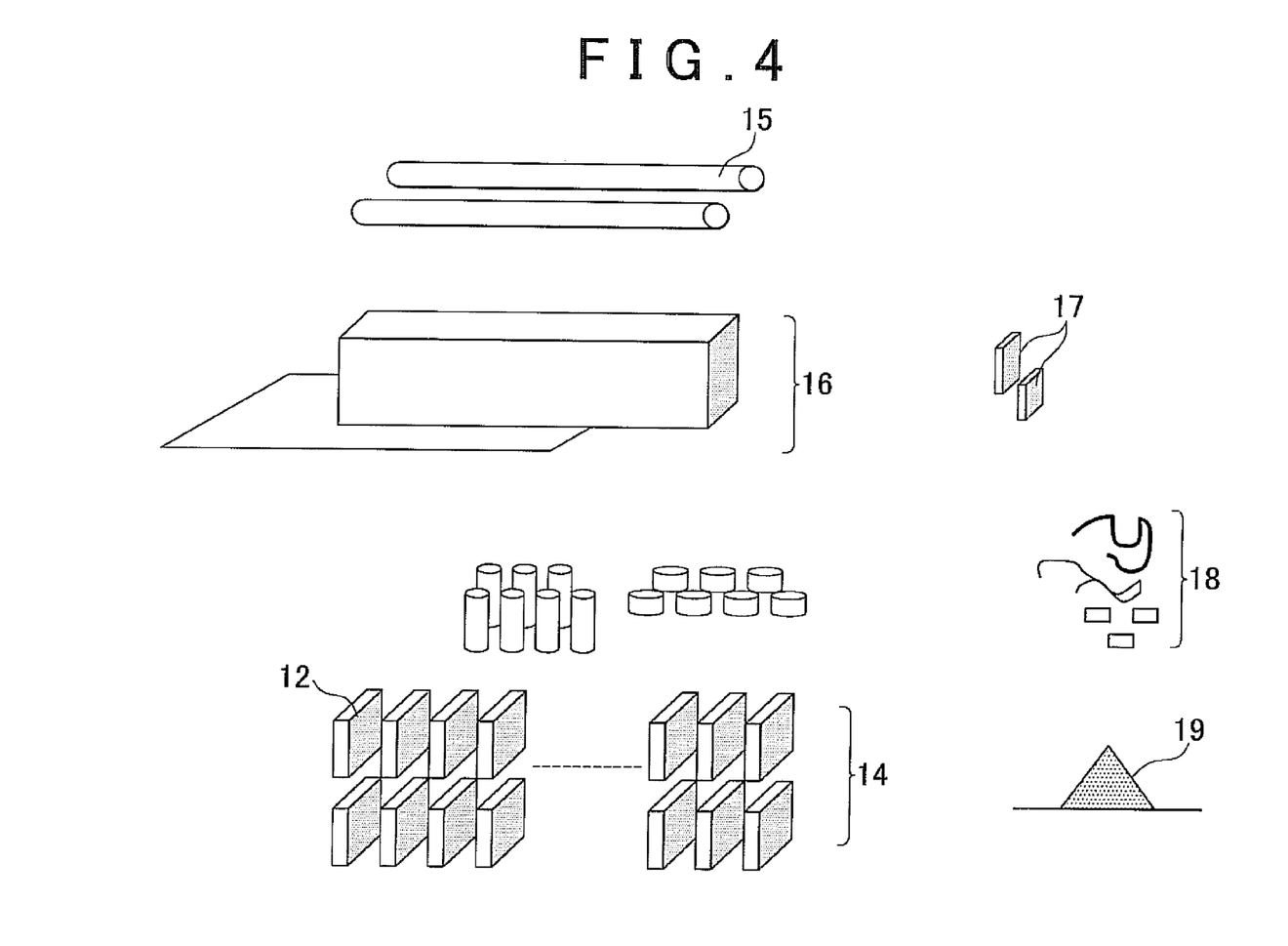
FIG. 4 is a view useful for explaining one example of constituent parts of a battery pack that has been roasted and dismantled according to this embodiment.

Next, the step (S112) of dismantling the roasted battery pack, and the steps (S114, S140) of separating or sorting pieces of the battery pack into unit cells and parts other than the unit cells as shown in FIG. 1 will be described with reference to FIG. 4 and FIG. 5. The battery pack is roasted as it is without being dismantled, so that resin materials used in various parts of the battery pack disappear due to thermal decomposition. Therefore, steps of detaching bolts and nuts for disassembling the battery pack after roasting can be greatly reduced or simplified. For example, exterior parts of unit cells comprising nickel-metal hydride batteries are made of resin, and the resin exterior parts are bolted to the battery pack with nuts embedded in the exterior, to be thus integrated with the battery pack. Accordingly, if resin disappears as a result of roasting, the unit cells can be easily taken out of the battery pack without detaching the bolts. Also, if the battery pack that has been discharged by shorting due to roasting is dismantled, it is separated into, for example, a battery assembly 14 consisting of unit cells 12, shafts 15, scraps 16 originating from the case and the lower plate, aluminum-containing scraps 17, copper scraps 18 originating from signal lines and power lines, thermally-decomposed residues 19 including ashes remaining after thermal decomposition of resin parts, and so forth, as shown in FIG. 4.

Figure 5:
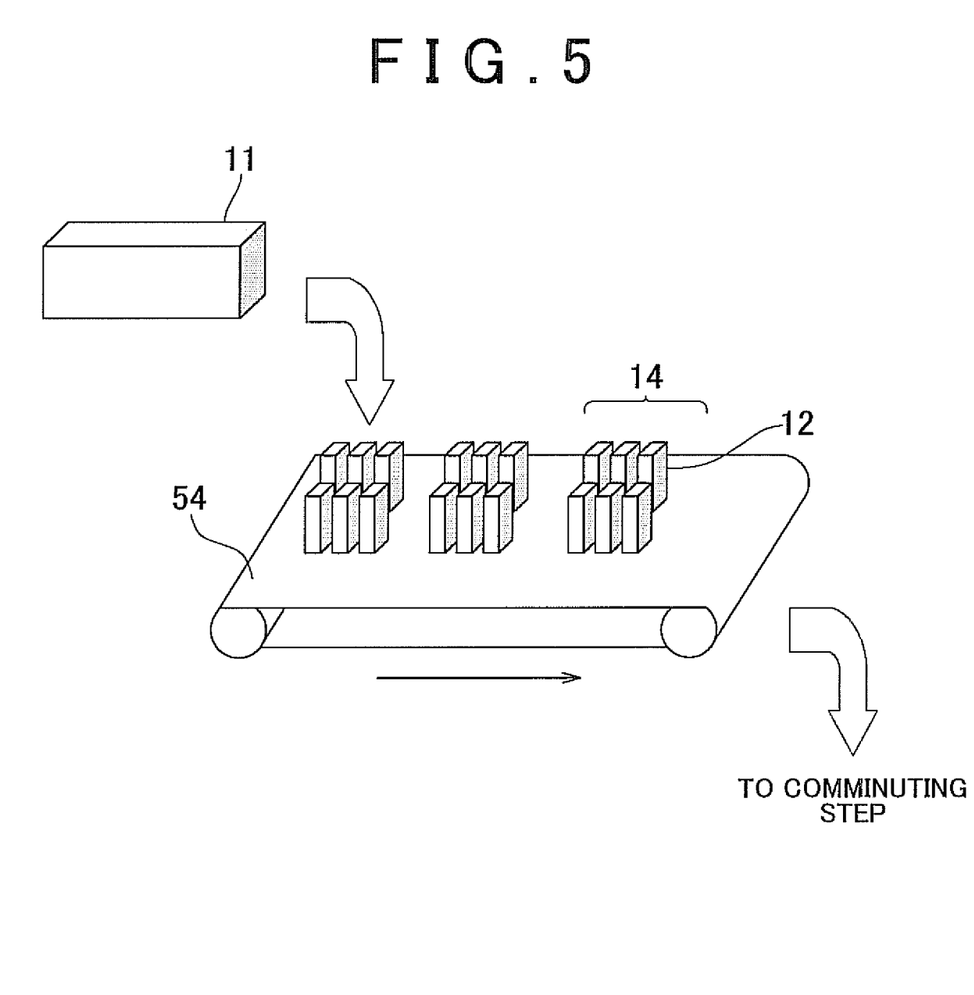
FIG. 5 is a view useful for explaining one example of transfer of roasted battery assemblies with unit cells of each battery assembly grouped together, to the comminuting step, according to this embodiment.

As shown in FIG. 5, the unit cells 12 of the battery assembly 14 obtained by dismantling of the roasted battery pack 11 may be grouped together for each battery pack, and fed to the next comminuting step by a belt conveyor 54. With this arrangement, a given amount of the unit cells 12 that constitute the battery assembly 14 can be charged into the comminuting device at a time, in the comminuting step as will be described later, without requiring a hopper and a fixed-quantity feeder (which will be described later). Thus, the time required for the relevant process can be shortened, and the battery-pack recycling apparatus can be made compact or its construction can be simplified.

Next, the step (S116) of comminuting or pulverizing the separated unit cells in this embodiment, step (S118) of washing and screening the comminuted cells, steps (S120, S112) of dewatering the slurry present below the sieve after the screening, and recovering metals used for positive electrode and negative electrode, and the steps (S130, S132) of magnetically separating metals present on the sieve after the screening, using a magnet, and recovering metal containing nickel will be described with reference to FIG. 6 and FIG. 7.

Figure 6:
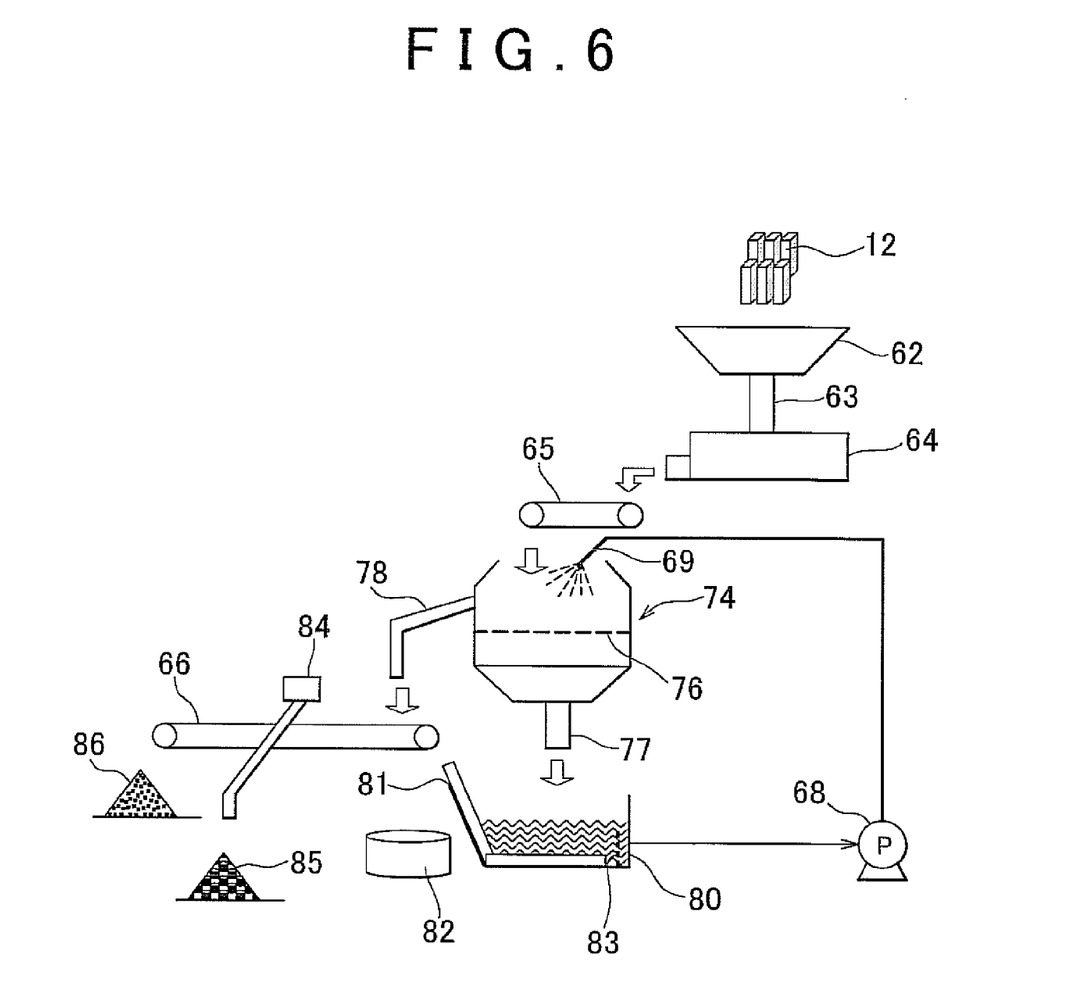
FIG. 6 is a view illustrating the arrangement of one example of separation equipment of this embodiment.

FIG. 6 illustrates one example of separation equipment for carrying out the above-described comminuting, washing/screening and separating/recovering steps. As shown in FIG. 6, the separation equipment includes a hopper 62 for charging the battery assembly consisting of a plurality of unit cells 12 into the equipment, an comminuting device 64 in the form of, for example, a shear shredder, a fixed-quantity feeder 63 for feeding a fixed quantity of unit cells into the comminuting device 64, a sieve shaker 74, and a belt conveyor 65 for feeding the materials comminuted by the comminuting device 64 to the sieve shaker 74. The separation equipment further includes a spray 69 for washing the comminuted materials charged into the sieve shaker 74 with a washer, a precipitation device 80 for separating by precipitation the positive-electrode and negative-electrode metallic materials as cell constituent materials that have passed a screen 76 (also called "sieve") of the sieve shaker 74 along with the washer, and a magnetic separator 84 for separating metallic solid matters having a relatively large particle size and remaining on the screen 76 of the sieve shaker 74 by magnetic separation using a magnet. Furthermore, a scraper 81, which is disposed in the precipitation device 80 to extend from the bottom to a side face thereof, serves to collect the positive-electrode and negative-electrode metallic materials 82 as the cell constituent materials precipitated in the precipitation device 80. In the meantime, a filter 83 is provided in the precipitation device 80, and the washer that has passed the filter 83 is fed via a pump 68 to the spray 69, and is injected from the spray 69 for washing the comminuted materials. The washer may be water. The above-mentioned sieve shaker 74 has an outlet 77 through which the materials below the sieve are taken out, and an outlet 78 through which the materials on the sieve are taken out. The metallic solid matters taken out of the outlet 78 are transferred by a belt conveyor 66, and are magnetically separated by the above-mentioned magnetic separator during the transfer process.

A separation procedure using the above-described separation equipment will be described. Initially, the unit cells 12 of the roasted battery assembly are charged into the hopper 62, and a fixed quantity of unit cells 12, which is measured by the fixed-quantity feeder 63, is charged into the comminuting device 64, where the charges (unit cells) are comminuted into pieces of, for example, about 30 mm or smaller. Then, the comminuted materials of the roasted unit cells are transferred the belt conveyor 65 and charged into the sieve shaker 74. In the sieve shaker 74, a washer composed of, for example, water is sprayed by the spray 69 onto the comminuted materials on the screen 76 of the sieve shaker 74, so as to wash the comminuted materials. The mesh size of the screen 76 is set to, for example, 5 mm to 10 mm, so that the positive-electrode and negative-electrode metallic materials, which are fine particles, pass through the screen 76 along with the washer, and are charged into the precipitation device 80 via the outlet 77. Then, the charges in the precipitation device 80 are left standing still, so that the positive-electrode and negative-electrode metallic materials having large specific gravities precipitate in the device 80. Then, the positive-electrode and negative-electrode metallic materials 82 are collected using the scraper 81 and thus recovered. On the other hand, the metallic solid matters remaining on the screen 76 of the sieve shaker 74 after spraying by the spray 69 are dropped onto the belt conveyor 66 via the outlet 78, and are separated by the magnetic separator 84 into an iron-rich metal component having relatively strong magnetizing force, and a nickel-rich metal component having relatively weak magnetizing force. The washer that is fed from the precipitation device 80 to the sieve shaker 74 via the filter 83 is supplied with water as needed by a water supply device (not shown), and the pH of the washer is suitably controlled, so that the washer that satisfies certain conditions circulates through the system.

The nickel-rich metal component 86 thus collected is a component recovered substantially as metal nickel from foamed nickel of electrode materials, since metals in the battery pack are roasted under a non-oxidizing atmosphere or reducing atmosphere in the above-described roasting step. Accordingly, the thus obtained metal nickel may be reused as a raw material of batteries, for example, as a raw material for producing nickel hydroxide. Also, the iron-rich metal component 85 thus collected may be used as a raw material for stainless steel.

On the other hand, the recovered positive-electrode and negative-electrode metallic materials 82 are rich in rare metals such as rare-earth metals, and have a small content of iron as an impurity; therefore highly pure rare metals can be easily obtained from the metallic materials 82 by a refining process, such as acid pickling.

Figure 7:
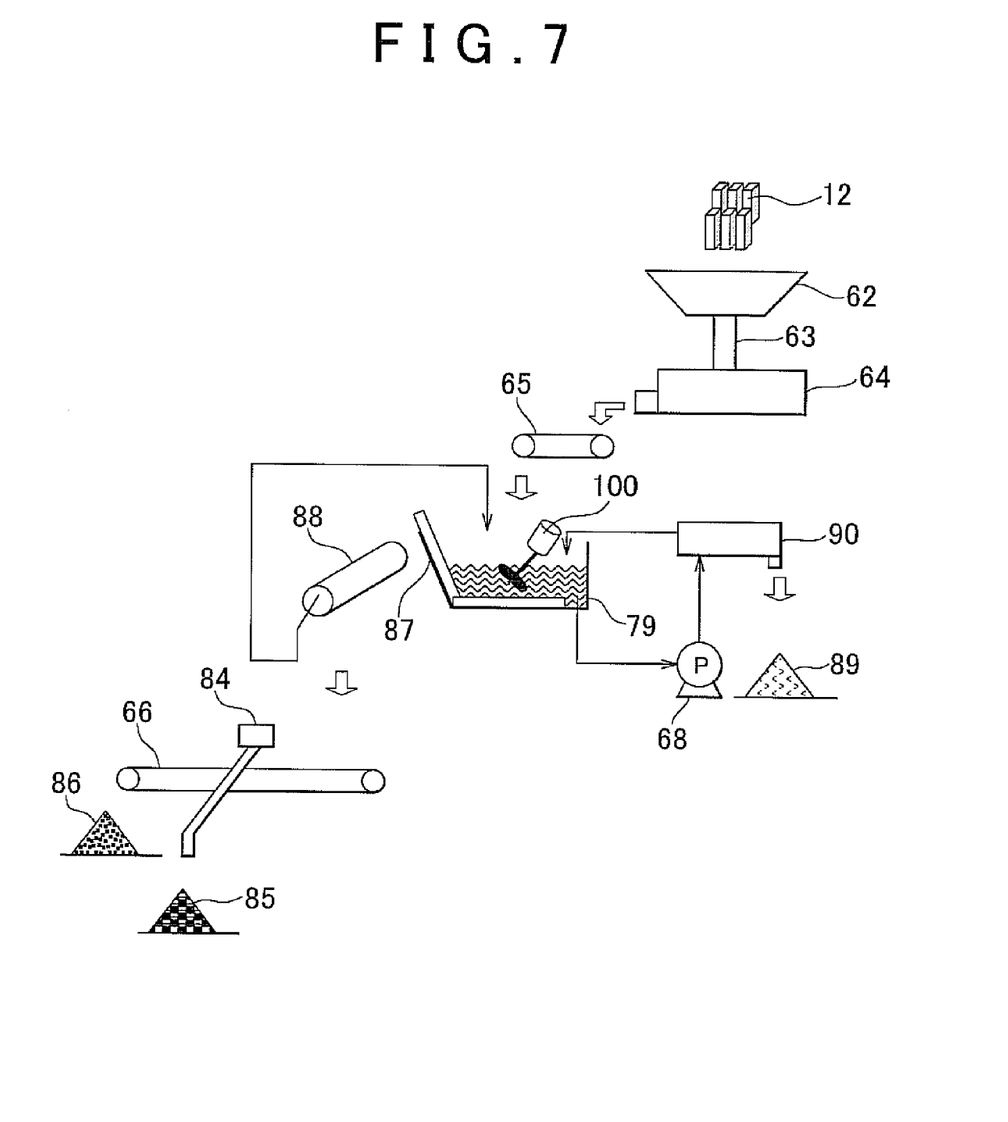
FIG. 7 is a view illustrating the arrangement of another example of separation equipment of this embodiment.

FIG. 7 illustrates another example of separation equipment for carrying out the comminuting, washing/screening, and separating/recovering steps. In FIG. 7, the same reference numerals as used in FIG. 6 are used for identifying the same or corresponding constituent elements, of which no explanation will be provided. The separation equipment as shown in FIG. 7 does not use the sieve shaker 74 and precipitation device 80 as shown in FIG. 6, and is arranged to charge the comminuted materials from the comminuting device 64 directly into a separation tank 79. The separation tank 79 has a precipitation pickup conveyor 87 provided on the bottom and side face of the separation tank 79, and a stirrer 100. The separation equipment as shown in FIG. 7 further includes a rotating sieve 88 for separating or screening the slurry taken out of the separation tank 79 by the precipitation pickup conveyor 87 according to the particle size, a pump 68 for pumping out slurry in the separation tank 79, and a dehydrator 90 for removing water from the slurry pumped out by the pump 68.

A separation procedure using the separation equipment as shown in FIG. 7 will be described. Initially, the unit cells 12 of the roasted battery assembly are charged into the hopper 62, and a fixed quantity of unit cells, which is measured by the fixed-quantity feeder 63, is charged into the comminuting device 64, where the charges (unit cells) are comminuted into pieces of, for example, about 30 mm or smaller. Then, the comminuted materials of the roasted unit cells are transferred by the belt conveyor 65, and charged into the separation tank 79. The slurry in the separation tank 79 is stirred constantly or intermittently by the stirrer 100. As a result, particles having relatively large specific gravities precipitate in the separation tank 79, and slurry containing the precipitation is charged into the rotating sieve 88 by the precipitation pickup conveyor 87. In the rotating sieve 88, metallic solid matters having relatively large particle sizes remain on the sieve, while slurry containing particles having relatively small particle sizes passes through meshes (of, for example, 3 to 10 mm) of the rotating sieve 88, and is returned into the separation tank 79. A spray device for spraying a washer, such as water, to the rotating sieve 88 may be provided on the rotating sieve 88. In this manner, the metallic solid matters and the slurry can be separated from each other with high accuracy. The slurry in the separation tank 79 is fed via the pump 68 to the dehydrator 90, where the slurry is separated into a cake 89 and the washer (e.g., water). The cake 89 consists of the positive-electrode and negative-electrode metallic materials as the cell constituent materials. The positive-electrode and negative-electrode metallic materials are rich in rare metals, such as rare-earth metals, and have a small content of iron as an impurity; therefore highly pure rare metals can be easily obtained by a refining process, such as acid pickling.

The metallic solid matters remaining on the sieve of the rotating sieve 88 are dropped onto the belt conveyor 66, and are separated by the magnetic separator 84 into an iron-rich metal component having relatively strong magnetizing force, and a nickel-rich metal component having relatively weak magnetizing force. The nickel-rich metal component 86 thus collected is a component recovered substantially as metal nickel from foamed nickel of electrode materials, since metals in the battery pack are roasted under a non-oxidizing atmosphere or reducing atmosphere in the above-described roasting step. Accordingly, the thus obtained metal nickel may be reused as a raw material of batteries, for example, as a raw material for producing nickel hydroxide. Also, the iron-rich metal component 85 thus collected may be used as a raw material for stainless steel.

The battery-pack recycling method and battery-pack recycling apparatus of the present invention may be effectively used for any application provided that they are applied to battery packs. In particular, the recycling method and recycling apparatus of the invention may be provided for recycling battery packs as automobile parts.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A method for recycling a battery pack including a battery assembly having a plurality of unit cells connected in series, and a controller that controls the battery assembly, said method comprising:
    providing a primary combustion chamber;
    providing a secondary combustion chamber;
    providing a preheating chamber positioned upstream from the primary combustion chamber;
    preheating the battery pack that houses the battery assembly to a first predetermined temperature;
    transferring the preheated battery pack into the primary combustion chamber;
    roasting the battery pack, that houses the battery assembly, in an assembled and a charged condition in the primary combustion chamber, the battery pack is roasted at a first roasting temperature if a resin part is contained in the battery pack, the first roasting temperature is equal to or higher than a carbonization temperature of a resin that forms the resin part and the first roasting temperature is equal to or lower than a melting point of each metal part of the battery pack, the battery assembly in the battery pack is roasted under a non-oxidizing or reducing atmosphere due to the consumption of oxygen during carbonization of the resin part;
    directing unburnt hot cracked gases produced by thermal decomposition of the resin materials in the battery pack from the primary combustion chamber to the secondary combustion chamber; and
    burning the directed unburnt hot cracked gases in the secondary combustion chamber at a second roasting temperature.

2. The method for recycling the battery pack according to claim 1, further comprising separating the roasted battery pack into the unit cells and parts other than the unit cells.

3. The method for recycling the battery pack according to claim 2, further comprising comminuting the unit cells obtained by separation.

4. The method for recycling the battery pack according to claim 3, further comprising:
    washing the comminuted unit cells; and
    screening the washed cells with a sieve.

5. The method for recycling the battery pack according to claim 4, further comprising recovering metal containing nickel from metals remaining on the sieve after screening, by magnetic separation using a magnet.

6. The method for recycling the battery pack according to claim 5, further comprising recovering metals, used for a positive electrode and a negative electrode, by dehydrating a slurry below the sieve after screening.

7. The method for recycling the battery pack according to claim 6, wherein the metal used for the negative electrode is a rare-earth metal.

8. The method for recycling the battery pack according to claim 1, wherein the second roasting temperature is greater than the first roasting temperature.

9. A method for recycling a battery pack including a battery assembly having a plurality of unit cells connected in series, and a controller that controls the battery assembly, said method comprising:
    providing a primary combustion chamber;
    providing a secondary combustion chamber;
    roasting the battery pack, that houses the battery assembly, in an assembled and a charged condition in the primary combustion chamber, the battery pack is roasted at a first roasting temperature if a resin part is contained in the battery pack, the first roasting temperature is equal to or higher than a carbonization temperature of a resin that forms the resin part and the first roasting temperature is equal to or lower than a melting point of each metal part of the battery pack, the battery assembly in the battery pack is roasted under a non-oxidizing or reducing atmosphere due to the consumption of oxygen during carbonization of the resin part;
    directing unburnt hot cracked gases produced by thermal decomposition of the resin materials in the battery pack from the primary combustion chamber to the secondary combustion chamber;

burning the directed unburnt hot cracked gases in the secondary combustion chamber at a second roasting temperature;

providing a cooling chamber positioned downstream of the primary combustion chamber;

transferring the roasted battery pack from the primary combustion chamber to the cooling chamber; and cooling the battery pack that houses the battery assembly to a second predetermined temperature.

10. The method for recycling the battery pack according to claim 9, wherein the cooling chamber includes a water spray which sprays the roasted battery pack with water to cool the roasted battery pack to the second predetermined temperature.

11. The method for recycling the battery pack according to claim 1, wherein the directed unburnt hot cracked gases in the secondary combustion chamber are burned for at least two seconds.

12. The method for recycling the battery pack according to claim 1, wherein the unburnt hot cracked gases in the primary combustion chamber are directed to the secondary combustion chamber through a gas duct connecting the primary combustion chamber and the secondary combustion chamber.

13. A method for recycling a battery pack including a battery assembly having a plurality of unit cells connected in series, and a controller that controls the battery assembly, said method comprising:

providing a primary combustion chamber;

providing a secondary combustion chamber;

roasting the battery pack, that houses the battery assembly, in an assembled and a charged condition in the primary combustion chamber, the battery pack is roasted at a first roasting temperature if a resin part is contained in the battery pack, the first roasting temperature is equal to or higher than a carbonization temperature of a resin that forms the resin part and the first roasting temperature is equal to or lower than a melting point of each metal part of the battery pack, the battery assembly in the battery pack is roasted under a non-oxidizing or reducing atmosphere due to the consumption of oxygen during carbonization of the resin part; and directing unburnt hot cracked gases produced by thermal decomposition of the resin materials in the battery pack from the primary combustion chamber to the secondary combustion chamber;

wherein an upper portion of the primary combustion chamber and an upper portion of the secondary combustion chamber are separated by a partition member, and wherein a lower portion of the primary combustion chamber and a lower portion of the secondary combustion chamber are in communication.

14. The method for recycling the battery pack according to claim 1, wherein the battery pack housing the battery assembly is heated from beneath a position at which the battery pack is located in the primary combustion chamber.

15. The method for recycling the battery pack according to claim 9, further comprising separating the roasted battery pack into the unit cells and parts other than the unit cells.

16. The method for recycling the battery pack according to claim 9, further comprising comminuting the unit cells obtained by separation.

17. The method for recycling the battery pack according to claim 9, further comprising:

washing the comminuted unit cells; and screening the washed cells with a sieve.

18. The method for recycling the battery pack according to claim 13, further comprising separating the roasted battery pack into the unit cells and parts other than the unit cells.

19. The method for recycling the battery pack according to claim 13, further comprising comminuting the unit cells obtained by separation.

20. The method for recycling the battery pack according to claim 13, further comprising:

washing the comminuted unit cells; and screening the washed cells with a sieve.

* * * * *